United States Patent [19]

Cantarutti

[11] 3,734,655
[45] May 22, 1973

[54] TIRE SHAPING AND CURING DEVICE
[75] Inventor: Armindo Cantarutti, Akron, Ohio
[73] Assignee: NRM Corporation, Akron, Ohio
[22] Filed: Nov. 1, 1971
[21] Appl. No.: 194,339

[52] U.S. Cl.....................................425/33, 425/43
[51] Int. Cl. ...............................................B29h 5/02
[58] Field of Search......................425/28, 33, 36, 38, 425/43, 45, 48, 58

[56] References Cited

UNITED STATES PATENTS

| | | | |
|---|---|---|---|
| 2,296,800 | 9/1942 | Sodecquist | 425/33 |
| 2,337,857 | 12/1943 | Sodecquist | 425/33 |
| 3,597,797 | 10/1971 | Delille | 425/38 X |
| 3,640,653 | 2/1972 | Laenen et al. | 425/38 X |

*Primary Examiner*—J. Howard Flint, Jr.
*Attorney*—Walter Maky

[57] ABSTRACT

A tire shaping device of the upstanding bladder type characterized in that support means for the upper end of the bladder is of non-circular form e.g., Y, cross, or regular polygon form with concavely curved sides, to cause uniform axial folding or pleating of the bladder when axially stretched to facilitate loading of a tire carcass thereover and stripping of the cured tire therefrom, the unstressed bladder being of barrel shape with a maximum diameter greater than the bead diameter of the tire and the crests or folds being of uniform spacing circumferentially around the bladder and being disposed at a diameter no greater than the bead diameter when the bladder is axially stretched so that the loading and unloading as aforesaid does not entail rubbing contact of the tire beads and bladder and consequent kinking of the beads.

7 Claims, 6 Drawing Figures

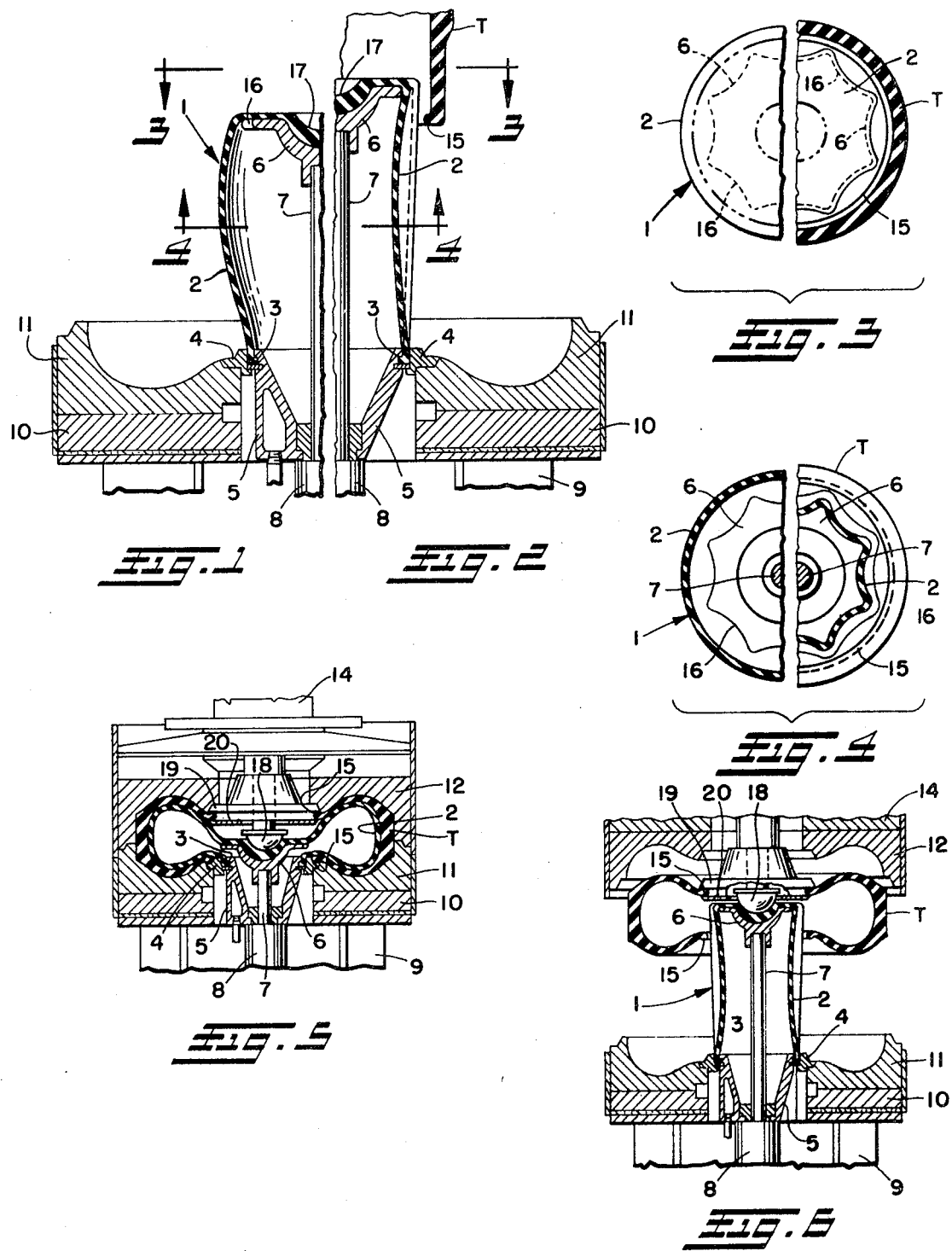

TIRE SHAPING AND CURING DEVICE

BACKGROUND OF THE INVENTION

It is known as disclosed in the U.S. Pat. Nos. 3,471,895, 3,581,345, and 3,584,335, and in the Laenen et al. U.S. application Ser. No. 50,833, filed June 29, 1970, now U.S. Pat. No. 3,640,653, to provide in a tire curing press an upstanding shaping and curing bladder over which a tire carcass is telescoped for shaping and curing in a tire shaped mold by introducing curing medium under pressure into the bladder, the bladder having a post assembly engaged with the upper end thereof which allows the bladder to be axially shortened and radially expanded for the tire shaping and curing operation and to be axially lengthened and radially contracted for the carcass loading operation and for the cured tire stripping operation. Such presses are also provided with a carcass loader which lowers an uncured carcass over the upstand bladder and which depresses the upper end of the bladder in case the axially distended dimension of the bladder exceeds the bead to bead dimension of the tire carcass as in a radial tire carcass, for example; and with a carcass unloader which has chuck members movable radially under the top bead of the cured tire to lift the tire out of the bottom mold section, to strip the tire from the bladder, to hold the tire when ejected by ejector means from the top mold section, and to shift the tire laterally of the bladder and of the bottom mold section for release onto an unloading conveyor when the chuck members are radially withdrawn from beneath the top bead.

In tire shaping and curing devices of the type referred to the bladder is generally of barrel-shaped form of diameter between its ends exceeding the bead diameter of the tire carcass, and has its open end clamped within the toe ring of the bottom mold section of the press. The upper end of the bladder is supported by a circular plate of diameter such that the tire carcass may be lowered around the bladder with its bottom bead engaging the toe ring of the bottom mold section when the bladder is stretched axially as by movement of the circular plate upwardly with respect to the clamped lower end of the bladder. The diameter of the bladder is thereby decreased but in so decreasing the diameter of the bladder (with or without vacuum assistance therewithin) it will assume an axially folded or pleated form in which the folds may be unevenly spaced with portions thereof projecting radially beyond the tire bead diameter. Such projecting fold portions will interfere with the loading of the carcass and unloading of the cured tire with resultant rubbing of the beads on the bladder and consequent possibility of bending or kinking of the beads.

SUMMARY OF THE INVENTION

A tire shaping and curing device of the upstanding bladder type characterized in that the support means for the upper end of the bladder has uniformly circumferentially spaced apart radial projections which cause uniform folding or pleating of the bladder when the latter is stretched axially by upward movement of the support means with respect to the clamped lower end of the bladder whereby all folded portions of the bladder are disposed at a diameter not greater than the carcass bead diameter thus to facilitate loading and unloading without rubbing of the bladder against the beads and consequent kinking of the beads. Such uniform folding or pleating also enhances bladder life and facilitates centering of the carcass on the bottom toe ring when the tire carcass is loaded over the upstanding and axially stretched bladder.

More specifically, the present invention provides support means for the upper end of the bladder which is of Y, cross, or regular polygon form having concavely curved sides which effects uniform pleating or folding when the bladder is axially distended.

BRIEF DESCRIPTION OF THE DRAWINGS

FIG. 1 is a radial cross-section view of a tire shaping device embodying the present invention, the same being shown in its unstressed condition;

FIG. 2 is a radial cross-section view showing the tire shaping device herein in axially distended form and showing a tire carcass being lowered therearound to engage its lower bead with the toe ring of the bottom mold section;

FIG. 3 is a cross-section view taken along the line 3—3, of FIGS. 1 and 2, showing at the left the unstressed circular shape of the bladder and showing at the right the uniformly corrugated or pleated form of the upper end of the bladder to facilitate lowering of the tire carcass over the bladder;

FIG. 4 is a cross-section view taken substantially along the line 4—4 of FIGS. 1 and 2 to illustrate at the left the normal circular shape of the bladder and the scalloped form of support means at the upper end of the bladder which causes uniform pleating or folding of the bladder as indicated at the right of FIG. 4 when the bladder is axially distended;

FIG. 5 is a fragmentary cross-section view of a tire curing press showing the top and bottom mold sections in mating engagement to define a tire shaped cavity and showing the bladder in its radially expanded form with its upper end depressed for movement of chuck segments radially outward underneath the top bead of the cured tire to effect stripping of the cured tire from the bottom mold section and from the bladder as the top mold section and upper end of the bladder are moved upwardly; and FIG. 6 is a fragmentary cross-section view of the FIG. 5 press in which the shaping and curing device has been again axially distended and uniformly folded or pleated to facilitate unloading of the cured tire therefrom.

DETAILED DESCRIPTION OF THE INVENTION

The tire shaping device 1 herein comprises a barrel-shaped bladder 2 having a bead 3 at its lower end which is clamped between the toe ring 4 and the spray ring 5 and which has its closed upper end engaged with a support plate 6, said plate 6 being engaged by the piston rod 7 whose piston is reciprocable in a cylinder 8. The base 9 of the press has supported thereon a heating platen 10 and a bottom mold section 11 which together with the toe ring 4 defines the bottom half of a tire shaped cavity. As well known the top mold section 12 is carried by an upper vertically reciprocable press head 14 and defines the upper half of the tire shaped cavity when the top and bottom mold sections 12 and 11 are in mating engagement as shown in FIG. 5. In presses of this character, the top mold section 12 is moved vertically as shown in FIG. 6 and when the cured tire T clears the upper end of the bladder 2 the press head 14 together with the top mold section 12 is moved laterally for discharge of the cured tire T and for loading of an uncured tire carcass T over the tire shaping device 1. The loading means are not herein shown by may comprise, for example, a loader of the type disclosed in the aforesaid patents.

As evident from FIG. 1, and from the left portions of FIGS. 3 and 4, the bladder 2 in its unstressed condition is of barrel-shaped form with a maximum diameter exceeding the diameter of the beads 15 of the carcass T. In order to effect radial contraction of the bladder 2 the piston rod 7 is actuated upwardly from the FIG. 1 position to the FIG. 2 position thus to axially distend the bladder 2 to decrease its diameter as shown in FIG. 2 and in the right portions of FIGS. 3 and 4 so that the uncured tire carcass T may readily be loaded with its bottom bead 15 engaged around the toe ring 4 of the bottom mold section 11.

To insure uniform pleating or folding of the bladder 2 when it is in axially stretched condition, the support plate 6 is of regular polygon form i.e. triangle, square, pentagon, hexagon, octagon, etc. with concave sides 16 to insure that the folding or pleating of the sides of the bladder 2 in its axially distended form will be uniform without radial projection of any portion of the folds thereof beyond the diameter of the carcass beads 15. Thus, when the carcass T is loaded, it may be readily lowered over the upstanding radially contracted bladder 2 as depicted in FIg. 2 so that its bottom bead 15 may be seated around the bottom toe ring 4 without the top or bottom beads 15 rubbing on the bladder 2 to shorten its life and without possibility of kinking of the beads 15.

As disclosed in the aforesaid patents the upper end of the bladder 2 is accurately located coaxially of the top and bottom mold sections 12 and 11 by reason of the molded socket 17 thereof fitting into a corresponding depression in the center of the support plate 6. Likewise, the molded socket 17 serves as a locating means for the pilot 18 at the center of the top mold section 12 which is operative to depress the upper end of the bladder 2 as the press head 14 and top mold section 12 are moved downwardly to engage the toe ring 19 with the upper bead of the carcass. As the lowering of the top mold section 12 continues, the bladder 2 is radially expanded to progressively cause bellying of the carcass T with the bladder 2 intimately engaged with the inner wall of the carcass T. When the top and bottom mold sections 12 and 11 are in mating engagement as shown in FIG. 5, curing medium under pressure will be sprayed into the expanded bladder 2 through the spray ring 5 to effect final shaping of the carcass T and curing thereof under heat and pressure. When the curing operation has been completed the bladder ram 18 may be moved downwardly as shown in FIG. 5 whereupon the chuck segments 20 may be moved radially outwardly to engage under the top bead 15 of the cured tire T. Accordingly, when the interior of the bladder 2 is vented the upward movement of the top mold section 12 will effect stripping of the bottom half of the tire T from the bottom mold section 11 and as upward fluid pressure is introduced into the cylinder 8 the upper end of the bladder 2 is maintained in engagement with the bladder ram 18 with consequent radial contraction of the bladder 2 to a diameter less than the tire bead diameter, whereby continued upward movement of the top mold section 12 and tire T will lift the latter over the upper end of the bladder 2. At the proper time, the top toe ring 19 may be moved downwardly to strip the upper half of the cured tire T from the top mold section 12 and when the top mold section 12 is shifted laterally the radial withdrawal of the chuck segments 20 will permit the tire T carcass to drop onto an unloading conveyor (not shown) disposed at the rear of the press. In some cases, the chuck segments 20 may be radially withdrawn while the top toe ring 19 is still seated in the top mold section 12 and when the stripping operation is appropriate the top toe ring 19 may be shifted downwardly to strip the tire T from the top mold section 12 and then a stripping bar (not shown) may engage the tire T to strip it from the top toe ring 19 for dropping down onto the unloading conveyor.

As known in the art, when the bladder 2 is axially extended as in FIGS. 2 and 6, a negative pressure inside the bladder 2 will effect yet further contraction thereof.

As now apparent, when the bladder 2 is axially stretched by upward movement of the support plate 6, it will be caused to progressively assume a scalloped shape as in the right portion of FIGS. 3 and 4 thereby avoiding the uneven and unpredictable folding which occurs when the support means is in the form of a circular support plate or a circular clamp means. In the illustrative example, the support means comprises an octagonal plate 6 having concavely curved sides 16 to eliminate the previously encountered uneven folding or pleating of the bladder 2 with consequent radial projection of the folds radially beyond the bead radius of the tire carcass T and with consequent interference with the loading and unloading operations aside from shortened bladder life and bead kinking. Instead of the plate 6 in the form of a triangle, square, pentagon, etc. with concave sides 16, radiating bars may be used in the form of a Y, a cross, etc. to determine the crests of the folds of the bladder 2.

The embodiments of the invention in which an exclusive property or privilege is claimed are defined as follows:

1. A tire shaping device for use with a tire curing press having separable mold sections which when in mating engagement define a tire shaped cavity, said device comprising an elastic bladder secured at one end to one mold section to extend axially toward the other mold section when said mold sections are axially separated, said bladder having a radially expansible side wall operative upon admission of curing medium under pressure therewithin to expand an uncured tire carcass therearound into engagement with such tire shaped cavity as said mold sections are moved to mating engagement; means engaging the other end of said bladder to axially stretch said bladder to decrease its diameter to facilitate loading of an uncured tire carcass thereover and unloading of a cured tire from therearound; non-circular support means at such other end of said bladder to induce axial folding of said bladder at circumferentially spaced areas so that the peripheral portions of said folds are inside the inner periphery of the tire shaped cavity when said bladder is axially stretched as aforesaid.

2. The tire shaping device of claim 1 wherein said bladder in its unstressed condition is of generally barrel-shaped configuration having a maximum diameter between its ends larger than the inner periphery of said tire shaped cavity.

3. The tire shaping device of claim 1 wherein said support means comprises a plate-like member disposed within said bladder and engaging such other end thereof.

4. The tire shaping device of claim 3 wherein said means to axially stretch said bladder comprises a reciprocable post means within said bladder engaging said plate-like member.

5. The tire shaping device of claim 1 wherein said support means comprises a plate-like member having at least three spaced radial projections which cause the bladder to assume an axially scalloped form with concavely curved portions extending axially toward such one end of said bladder.

6. The tire shaping device of claim 1 wherein said support means comprises a plate-like member with a form having rounded vertices and concavely curved sides to cause formation of axially extending folds corresponding to the scalloped configuration of said plate-like member.

7. The tire shaping device of claim 6 wherein said bladder in its unstressed condition is of generally barrel-shaped configuration having a maximum diameter between its ends larger than the inner periphery of said tire shaped cavity.

* * * * *